(12) United States Patent
Kimura et al.

(10) Patent No.: US 6,654,686 B2
(45) Date of Patent: Nov. 25, 2003

(54) NO PREAMBLE FRAME SYNC

(75) Inventors: Akira Kimura, San Francisco, CA (US); Paul W. McBurney, San Francisco, CA (US)

(73) Assignees: Seiko Epson Corporation, Tokyo (JP); eRide, Inc., San Francisco, CA (US)

( * ) Notice: Subject to any disclaimer, the term of this patent is extended or adjusted under 35 U.S.C. 154(b) by 0 days.

(21) Appl. No.: 10/079,250

(22) Filed: Feb. 19, 2002

(65) Prior Publication Data

US 2003/0158662 A1 Aug. 21, 2003

(51) Int. Cl.[7] .............................................. G01C 21/28
(52) U.S. Cl. .................. 701/213; 701/215; 342/357.06; 342/357.09; 342/357.13
(58) Field of Search ................................ 701/213, 215, 701/200; 342/357.06, 357.09, 357.12, 357.13

(56) References Cited

U.S. PATENT DOCUMENTS 5,731,786 A * 3/1998 Abraham et al. ...... 342/357.08
6,437,734 B1 * 8/2002 McBurney et al. .... 342/357.09
6,473,030 B1 * 10/2002 McBurney et al. .... 342/357.03

OTHER PUBLICATIONS

Publication No. U.S. 2002/0171581 A1 which is U.S. 09/201,672 Filed Nov. 30, 1998.*

* cited by examiner

Primary Examiner—Gertrude Arthur

(57) ABSTRACT

A navigation-satellite receiver uses a reference station accessible over a network to store NAV data subframes for pattern matching at a network client. Alternatively, the pattern matching is performed by the server when per-byte communication costs are high. The stored NAV data repeats ephemeris data every thirty seconds, and full almanac data every 12.5 minutes. This permits the client to instantly recognize where in the NAV data sequence its own received signals are, and it need not actually wait to receive the preambles in the TLM words. Several precious seconds are therefore saved in producing a rapid time-to-first-fix.

11 Claims, 2 Drawing Sheets

NO PREAMBLE FRAME SYNC

FIELD OF THE INVENTION

Figure 1:
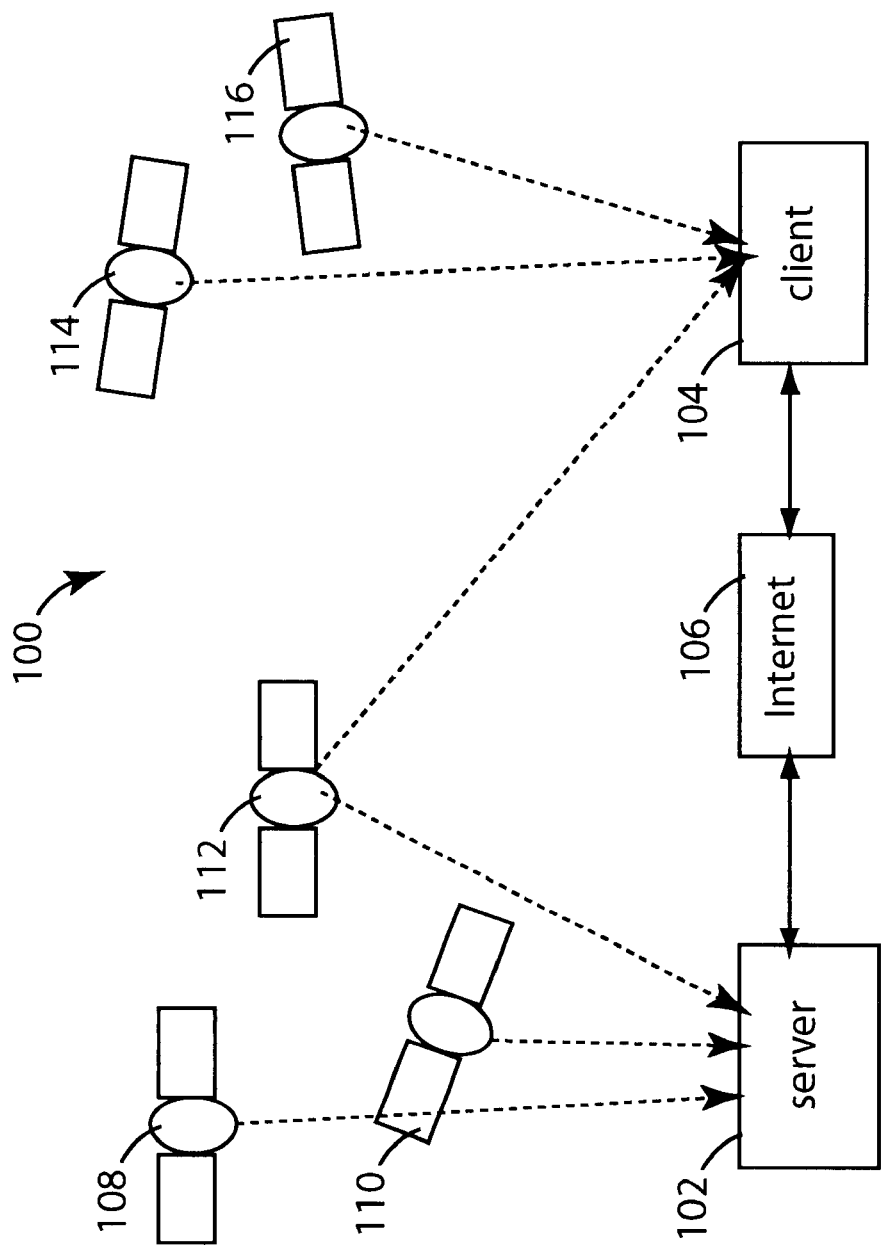

The present invention relates to navigation satellite receivers, and more particularly to methods and systems for improving the time-to-first-fix of navigation satellite receivers with assistance being provided by a network server.

DESCRIPTION OF THE PRIOR ART

Global positioning system (GPS) receivers use signals received from several earth-orbiting satellites in a constellation to determine user position and velocity, and other navigational data. A navigation receiver that has just been turned on does not yet know where it is, how much its crystal oscillator is in error, nor what time it is. All these are needed to find and lock onto the satellite transmissions, and so a search must be made of all the possibilities.

Each GPS satellite vehicle (SV) transmits navigation (NAV) data at fifty bits-per-second, and includes ephemeris, clock and almanac information. Such information allows a GPS receiver to compute its position, velocity, and time. One whole data frame of NAV data is 1500-bits long, and thus takes thirty seconds to transmit.

Each data frame is divided into five subframes 1–5, and each subframe is 300-bits long, e.g., ten 30-bit words. Thus it takes six seconds to transmit each 300-bit, 10-word subframe. Every subframe starts with a telemetry (TLM) word of 30-bits, followed by a hand-over word (HOW) of 30-bits. Both 30-bit words comprise 24-bits of data and 6-bits of parity. There are eight words of data payload in each subframe.

The TLM word at the front of each 300-bit subframe begins with an 8-bit preamble. The preamble allows the start of a subframe to be recognized, and thereafter provides a primary mechanism for the receiver to be synchronized.

The first 300-bit subframe transmits the SV-clock correction data after the TLM word and HOW. The second subframe transmits the first part of the SV-ephemeris data. The third subframe transmits the second part of the SV-ephemeris data. Subframes four and five are used to transmit different pages of system data. The fourth subframe also begins with the TLM word and HOW, and the data payloads rotate over 12.5 minutes to transmit the lengthy information about the ionosphere, UTC, and other data. An entire set of twenty-five frames (125 subframes) makes up the complete Navigation Message that is sent over such 12.5 minute period. The fifth subframe begins with the TLM word and HOW, and its data payload also rotates over 12.5 minutes to transmit the rather large almanac.

The clock data parameters describe the SV clock and its relationship to GPS time. The ephemeris data parameters describe SV orbits for short sections of the satellite orbits. Normally, a receiver gathers new ephemeris data each hour, but can use old data for up to four hours without much error. The ephemeris parameters are used with an algorithm that computes the SV position for any time within the period of the orbit described by the ephemeris parameter set. The almanacs are approximate orbital data parameters for all SV's. The ten-parameter almanacs describe SV orbits over extended periods of time, and is sometimes useful for months.

The signal-acquisition time of a GPS receiver at start-up can be significantly speeded by having the current almanac available. The approximate orbital data is used to preset the receiver with the approximate position and carrier Doppler frequency of each SV in the constellation.

So in prior art devices, the synchronization of the receiver to NAV data transmissions depends on the detection of the preamble pattern ("8B") in the TLM word. Since the TLM word is only transmitted every six seconds, it can take three seconds or more to detect it. Such delays degrade time-to-first-fix (TTFF) performance, an important user criteria.

SUMMARY OF THE INVENTION

It is therefore an object of the present invention to provide a method and system for navigation satellite reception and receiver initialization that can proceed without actually receiving the preamble in the TLM word.

It is another object of the present invention to provide a method and system for shortening the time needed for initialization of navigation devices.

It is a further object of the present invention to provide a satellite-navigation system that is inexpensive.

Briefly, a navigation-satellite receiver embodiment of the present invention uses a reference station to store NAV data subframes for pattern matching at a client. Alternatively, the pattern matching is performed by the server when per-byte communication costs are high. The stored NAV repeats ephemeris data every thirty seconds, and full almanac data every 12.5 minutes. This permits the client to quickly recognize where in the NAV data sequence its own received signals are, and need not actually wait to receive the preambles in the TLM words. Several precious seconds are therefore saved in producing a rapid time-to-first-fix.

An advantage of the present invention is that a system and method are provided that produce faster initialization times in navigation satellite receivers.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
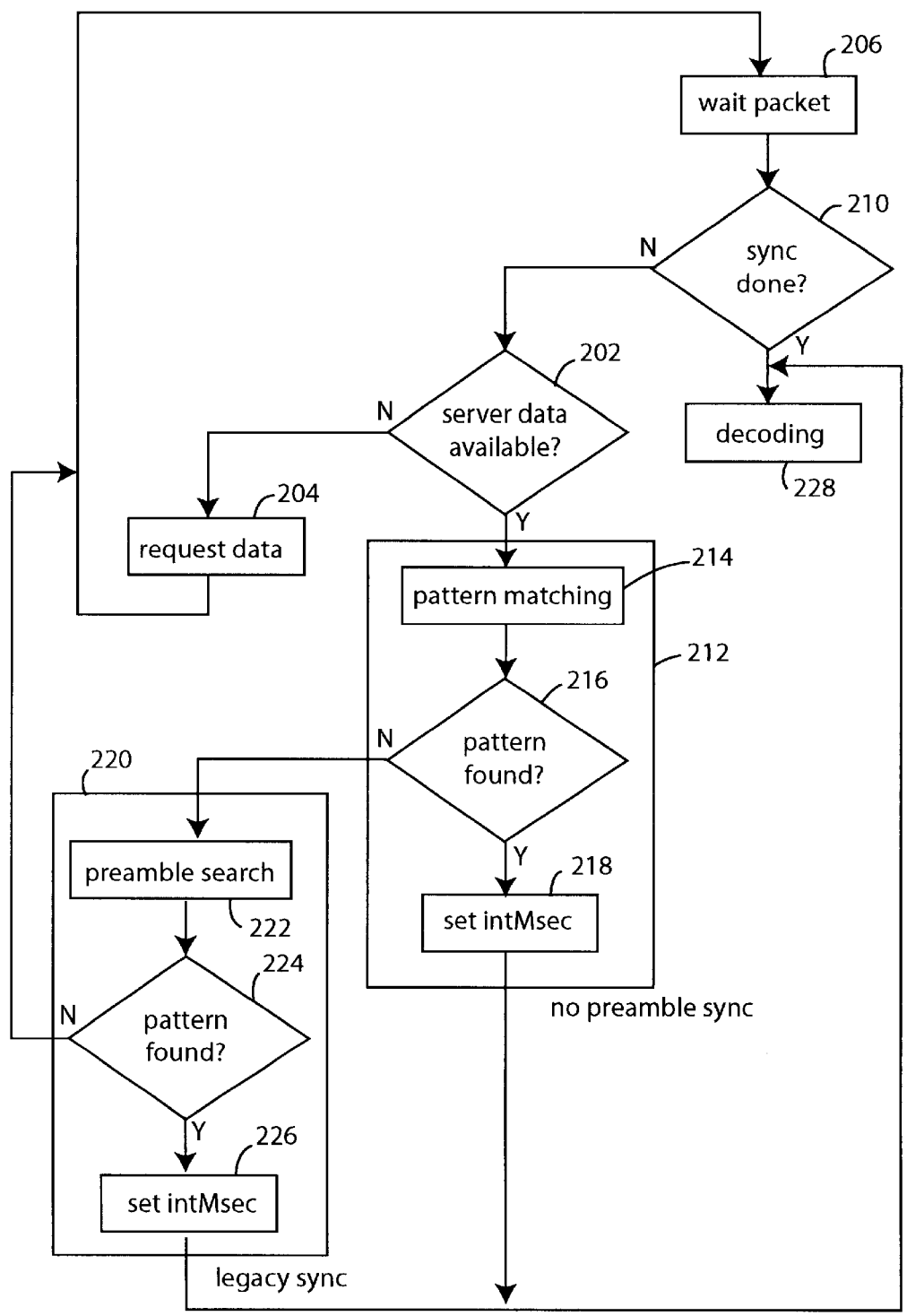

FIG. 1 is a functional block diagram of a network system embodiment of the present invention wherein a server is assisting a client with time information communicated over the Internet; and FIG. 2 is a flow chart of a method embodiment of the present invention.

DETAILED DESCRIPTION OF THE PREFERRED EMBODIMENT

FIG. 1 illustrates a network system 100, in an embodiment of the present invention, that includes a reference-station server system 102, a user client system 104, and an intervening computer network 106 such as the Internet. The server system 102 includes a navigation satellite receiver that has locked onto and is tracking a constellation of navigation satellites 108, 110, and 112. Some of these may also be visible to the client system 104. Another constellation of navigation satellites, including 114 and 116 is visible to client system 104. The client system 104 includes its own navigation satellite receiver, but such may not have yet locked onto and be tracking its constellation of navigation satellites 112, 114, and 116.

The server system 102 is intended to be always on and tracking its constellation of navigation satellites 108, 110, and 112. It is then able to discern accurate, absolute system time and may also provide current ephemeris, troposphere, ionosphere, and other information to other, not-yet-initialized navigation satellite receivers connected as network clients. Such information all needs to be determined during initialization, and spoon feeding any of it from another source will dramatically improve time-to-first-fix.

In particular, the server system 102 stores the 12.5 minute repeating NAV data message. It forwards parts of this on request to the client system 104. Such allows the client system 104 to do pattern matching of NAV data it receives with the stored-and-forwarded NAV data. The client system 104 can thereby synchronize to the NAV data frames even before receiving its first preamble in its first TLM word.

The client system 104 will typically have its own 24-bit millisecond clock (Msec24) that starts at zero when its power is turned on. Each epoch of the GPS C/A-code is one millisecond. The server system 102 will know GPS time, and have the Z-count. The Z-count is a 29-bit binary number that represents a fundamental GPS time unit. The ten most significant bits carry the GPS week number, and the nineteen least significant bits give the time of week (TOW) count in units of 1.5 seconds. A much finer gauge of the system time is available once the receiver locks onto a few GPS satellites. Prior art devices have depended on determining the Z-count during initialization.

What specifically needs to be determined during the initialization of client system 104 is how much of an offset needs to be added to the client's local clock, e.g., Msec24, to equal GPS time. This will dictate the correct NAV data frame synchronization. The time required to achieve such synchronization will be dramatically reduced in the client system 104 if a subframe that has just been received is used as a template to search the sequential record of subframes the server system 102 has observed.

Alternatively in situations where the per-byte cost of communicating over the network is relatively high, it will be more economical for the client system 104 to forward the signal snapshots it has gathered to the server system 102. The server system then has the job to find any pattern matches. In such cases, the server system 102 then sends data that helps the client identify the current integer millisecond to use.

In such alternative, the server system 102 preferably saves the NAV-data subframes for every SV the reference station tracks. It then estimates the network latency that exists between itself and the several network clients 104. This enables an estimate of GPS-time to be made for each client. Such GPS-time then indicates which portion of the NAV-data subframes should be currently observed at the client. The server system copies these NAV-data subframes, rewrites the z-count, and appends parity bits in the HOW-word before sending it to the client.

In a method embodiment of the present invention, the client system 104 gets approximate GPS time from the server system 102, e.g., to within a second or two of true GPS time. There will be some network path delays over network 106 between the server system 102 and the client system 104. And such delays are accounted for.

The client system 104 requests NAV data subframes from the server system 102 by specifying a GPS time of interest, e.g., a particular millisecond interval. The server system 102 fetches a corresponding set of subframe patterns from its database. It rewrites the HOW word with the expected Z-count, and adds appropriate parity bits. The requested subframes are sent over the network 106.

The client system 104 uses a 30-bit long moving window to inspect the subframe data provided by the server system 102, and tries to find a match with what it has just received directly from an SV. If there is no match, the window is shifted one bit, and the 30-bit words are compared again-and-again. When a 30-bit match is found, the preceding and following words are also tested for verification. Finding matches there too will indicate frame synchronization has been found. The offset time can then be computed and added to Msec24 to initialize the client system 104 with GPS time. More precisely, the Z-count is extracted from the current HOW word in the NAV subframe data.

In general, embodiments of the present invention rely on a pattern-matching technique. Certain patterns are a problem, so it is necessary to reject unreliable bit patterns like "FFFFFF", "000000", "AAAAAA", "555555". Such patterns commonly appear in unlaunched SV or undefined almanac pages. Another pattern-matching problem is caused by bit reversals.

The typical receiver firmware sometimes fails to detect phase reversal of NAV data when the signal is too weak. If the receiver fails to detect the change, all the bits following the change will need to be flipped. Therefore some bit-phase reversal should be expected. According to observations in mixed DEMI mode, as many as thirty phase reversals can occur. The TLM word marks the head of subframe and appears every ten 30-bit words. The HOW word follows and carries the top 17-bits of Z-count, and the preceding 2-bits at the tail of Word-10 is always "00". Since in these areas NAV pattern is very similar, we can't match with TLM pattern if the search window exceeds ten words.

After getting approximate time, client 104 requests subframe data from server 102 in advance. The GPS time returned to client 104 will have been indeterminately delayed by the latency of network 106, e.g., and so has $\sigma_{latency}$ ambiguity.

In one embodiment, the NAV packet is sent as a group packet with a maximum two-second latency, e.g., group NAV interval (1,000 msec)+maximum NAV packet length (1,000 msec). Thus client 104 should request a subframe with starting time=expected NAV packet reception time−$(\sigma_{latency}+2$ sec.$)$.

Taking into account the latency by the network and system response, a decision is made for an adequate word length to be sent to client 104. Consider, $$n/2(\text{word}) \times 30 \text{ bits} \times 20 \text{ msec} > \Delta t_t - \Delta \hat{t} + pkt\_\text{size} \times 20 \text{ msec}$$

$$\Delta t_t - \Delta \hat{t} = (n/2 \times 30 - pkt\_\text{size}) \times 20$$

$$\text{where} \begin{cases} n: \text{ words}(10-50) \\ \Delta t_t: \text{ TrueLatency[ms]} \\ \Delta \hat{t}: \text{ EstimatedLatency[ms]} \end{cases}.$$

The NAV data stream repeats itself every fifty words, or five subframes numbers 1–5. If the server 102 sends more than ten words, a TLM word cannot be used to match because the pattern of TLM word repeats every beginning of subframe.

In one embodiment, once the frame is synchronized, GPS time can be determined by counting bits from the end of next HOW word and beginning of the NAV packet. The HOW word carries 17-bits of truncated Z-count. The offset from the end of the HOW word to beginning of next subframe is 240 bits, e.g., 4800 msec. Subtracting such offset from next subframe produces current GPS time. E.g., GPSTime(@msec24)=Zcount×6000−(offset+240)×20−70 [msec].

The exact transmission propagation time between SV and surface of the earth is difficult to know, so a default value of 70-milliseconds seems reasonable because using it as a start gives a ±10 milliseconds ambiguity.

The integer millisecond ("intMsec") represents the pseudorange between user position and SV position. When computing GPS time for a first Z-count event, intMsec is assumed to be 70 milliseconds. The offset time between the msec24 variable and GPS time ("offGpsMsec") is then calculated. After the first Z-count event, that event doesn't apply for GPS time adjustment, but is used for only intMsec calculation. Based on offGpsMsec, integer millisecond (intMsec) for each SV is solved using the following equations. GPS time and offGpsMsec are adjusted by solving for time bias in a position-fix routine. E.g., offGpsM sec=Zcount×6000−{m sec 24+(offset+240)×20}−70[m sec]

intM sec=Zcount×6000−{m sec 24+(offset+240)×20}−offGpsM sec.

In preferred no-preamble sync method embodiments of the present invention, a fall-back TLM-preamble sync detection process is included just-in-case the pattern-matching fails. Both schemes simply set the synchronized position, e.g., word ID, subframe ID, page ID, and the current Z-count. So the two schemes can independently co-exist. When support is available to client 104 from server 102, the pattern-matching technique is tried first. Then using the TLM word preamble for synchronization is tried. If either scheme succeeds, a receiver manager can smoothly shift the decoding. The frame edge can therefore generally be synchronized inside of six seconds from power-up, even if a suitable bit pattern is not available for no-preamble sync pattern matching.

The reference station server 102 supports such no-preamble sync pattern matching by saving the subframe data for each SV. It estimates network latency and speculates the GPS time on client 104. The server 102 retrieves the corresponding subframe data that centers on the client GPS time. It rewrites the Z-count in the HOW word and encodes subframe data in packets sent to the client 104.

Each such subframe data received on reference station is stored in the database. The subframe data to be stored includes 5,780 bytes of ephemeris data, and 3,000 bytes of almanac data, e.g.,

--- ephemeris = 3 (subframes) *10 (words) *24bits (w/o parity) *32 (SV)
    *2 (pre/current IODE) ;
almanac = 25 (pages) *2 (SF) *10 (words) *24bits (w/ parity)
    *2 (pre/current) .

---

Since the NAV stream from the SV repeats, all the NAV bits do not need to be stored. The server can ignore some subframe data and all the word parity bits. When the system ephemeris changes, the no-preamble pattern matching will fail until both the reference station server 102 and client 104 actually receive the new ephemeris subframes. The same is true for system almanac changes. Sometimes it takes over twelve hours for the almanac data from all SV's to be completely updated to new almanac set. So both the previous and current almanac data must be stored in the database.

The client 104 initializes by getting subframe data from the server 102 coincident with current GPS time. To do this, the server 102 approximates GPS time the information packets transmitted over network 106 will actually be received by the client 104. How close the time is depends on how accurate the server can estimate GPS time on the client, and also the size of the word data to be sent to the client. If the server can estimate client GPS time within ±3 seconds, it's possible to synchronize the NAV frame within ten data words, e.g., one subframe.

After estimating the GPS time at client 104, the server 102 retrieves in the database and gets the appropriate subframe data corresponding to that current GPS time. Since there are two sets of ephemeris and almanac, the server 102 should track which data set should be used by SV. In encoding the information words, the subframe data from WORD-1, and the TLM word and needed. The parity bits depend on the last 2-bits of previous word data, and the last bits of both the HOW and WORD-10 are "00".

It is important to rewrite HOW word. The server knows the current GPS time, so it can modify the Z-count in HOW word and fix the associated parity bits. The server 102 preferably sends a starting-word identification (ID) and ten 30-bit words of data.

A method embodiment of the present invention is represented in FIG. 2. Such provides for NAV data frame synchronization in a GPS receiver connected to a data network able to provide archived NAV data frames. The method 200 begins with a step 202 that tests whether a server is available, e.g., server 102 in FIG. 1. If not, a step 204 requests such, as step 206 waits for the request to be answered. A step 210 sees if synchronization has been found. If not, control returns back to step 202.

If the server data is available, a no-preamble sync pattern-matching process 212 is used. A step 214 tries matching the NAV data patterns received from an SV to those provided by the server. If a pattern match is found in a step 216, then the integer millisecond ("intMsec") can be set in a step 218.

If no pattern can be matched in the pattern-matching process 212, then a legacy sync process 220 is used as a fallback strategy. A step 222 does a conventional TLM word preamble search. A step 224 looks to see if a pattern has been found. If yes, a step 226 sets the integer millisecond ("intMsec"). Once the integer millisecond variable has been set, a step 228 proceeds with the decoding and position solution.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A navigation satellite receiver system, comprising:
   a navigation-satellite-receiver reference-station network server for providing various parts of particular time-marked 50-Hz NAV-data transmissions it receives from each of a first constellation orbiting navigation satellites; and
   a navigation-satellite-receiver network client for providing a user with a position solution based on transmissions it receives from a second constellation orbiting navigation satellites;
   wherein, the network server estimates a network transmission delay that exists between itself and the network client, and that repeats and modifies said NAV-data transmissions to the network client for its use in a pattern-matching initialization process, and so such arrive with current local GPS time information at the network client; and wherein, the network client is able to synchronize to a GPS NAV-frame without requiring the acquisition of a GPS TLM-word preamble.

2. A navigation-satellite-receiver reference-station network server, comprising:

a navigation-satellite receiver for receiving GPS NAV-data transmissions it receives from a first constellation orbiting navigation satellites;

a database for storing parts of said GPS NAV-data transmissions;

a server for connection to a network and able to respond to client requests for current GPS NAV-data; and a GPS NAV-data modification processor for adjusting information in said parts of said GPS NAV-data transmissions to appear as current data at a network client.

3. A navigation-satellite-receiver user network client, comprising:

a navigation-satellite receiver for directly receiving current GPS NAV-data transmissions from orbiting navigation satellites, and initially needing integer millisecond (intMsec) information to begin operation;

a client for connection to a network and able to issue to client requests to a server for GPS NAV-data patterns; and a pattern-matcher able to find correspondences between GPS NAV-data patterns provided by said server and said GPS NAV-data directly obtained;

wherein, said server assists the client to achieve GPS NAV-data frame synchronization.

4. The network client of claim 3, wherein:

the pattern matcher includes a processor for discarding unreliable pattern types.

5. The network client of claim 3, wherein:

the pattern matcher includes a processor for reversing-out bit-reversals that may have occurred in the received information.

6. A navigation-satellite-receiver user network client, comprising:

a navigation-satellite receiver for directly receiving current GPS NAV-data transmissions from orbiting navigation satellites, and initially needing integer millisecond (intMsec) information to begin operation;

a client for connection to a network and able to provide partial GPS NAV-data patterns to a network server that it has received itself directly; and a server-side pattern-matcher located at said server able to find correspondences between GPS NAV-data patterns provided by said client and a more complete GPS NAV-data directly obtained and stored in a database;

wherein, said server assists the client to achieve GPS NAV-data frame synchronization.

7. The network client of claim 6, wherein:

the server-side pattern matcher includes a processor for discarding unreliable pattern types.

8. The network client of claim 6, wherein:

the server-side pattern matcher includes a processor for reversing-out bit-reversals that may have occurred in the information received by said client.

9. A method for initializing a navigation-satellite-receiver network client, the method comprising the steps of:

estimating a network delay between a server and a client on a network;

collecting GPS NAV-data information and storing it in a database at said server;

requesting a sample of said GPS NAV-data from said client;

adjusting the information carried in a requested sample of said GPS NAV-data to arrive with current Z-count information at said client after said network delay;

pattern-matching said sample of said GPS NAV-data with said adjusted information to another real-time GPS NAV-data being directly received by said client; and finding GPS NAV-data frame synchronization at said client without a TLM preamble search.

10. A method for initializing a navigation-satellite-receiver network client, the method comprising the steps of:

estimating a network delay between a server and a client on a network;

collecting GPS NAV-data information and storing it in a database at said server;

requesting a sample of said GPS NAV-data from said client;

adjusting the information carried in a requested sample of said GPS NAV-data to arrive with current Z-count information at said client after said network delay;

pattern-matching said sample of said GPS NAV-data with said adjusted information to another real-time GPS NAV-data being directly received by said client;

attempting to find GPS NAV-data frame synchronization at said client without a TLM preamble search;

otherwise, conducting a TLM preamble search and thereby achieving GPS NAV-data frame synchronization.

11. The method of claim 10, further comprising the step of:

using GPS NAV-data frame synchronization to set an integer millisecond variable that represent a time offset between GPS time at a reference station server and a local mSec24 clock in said client.

* * * * *